US012265932B2

(12) United States Patent
Rogers et al.

(10) Patent No.: US 12,265,932 B2
(45) Date of Patent: Apr. 1, 2025

(54) SYSTEM AND METHOD FOR ASSESSING AN OPERATING CONDITION OF AN ASSET

(71) Applicant: Booz Allen Hamilton Inc., McLean, VA (US)

(72) Inventors: David Lawrence Rogers, Birmingham, MI (US); James Eric Syphard, Bel Air, MD (US); Sean Patrick McKenna, Melrose, MA (US); Douglas Paul Hamrick, Rochester Hills, MI (US); Jonathan Robert Lee Mulholland, Catonsville, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 1226 days.

(21) Appl. No.: 17/029,333

(22) Filed: Sep. 23, 2020

(65) Prior Publication Data

US 2021/0089907 A1   Mar. 25, 2021

Related U.S. Application Data

(60) Provisional application No. 62/904,444, filed on Sep. 23, 2019.

(51) Int. Cl.
*G06N 3/08* (2023.01)
*G06F 9/54* (2006.01)
(Continued)

(52) U.S. Cl.
CPC ..... *G06Q 10/063116* (2013.01); *G06F 9/545* (2013.01); *G06F 18/213* (2023.01);
(Continued)

(58) Field of Classification Search
None
See application file for complete search history.

(56) References Cited

U.S. PATENT DOCUMENTS 6,175,787 B1 *  1/2001  Breed ............... G07C 5/008
                                                702/182
10,308,218 B2   6/2019  Golduber
(Continued)

FOREIGN PATENT DOCUMENTS

JP   H09196825 A   7/1997
JP   2002090267 A  3/2002
(Continued)

OTHER PUBLICATIONS

International Search Report (PCT/ISA/210) issued on Dec. 15, 2020, by the US Patent Office as the International Searching Authority for International Application No. PCT/US20/52232.
(Continued)

*Primary Examiner* — Daniel T Pellett
(74) *Attorney, Agent, or Firm* — Buchanan Ingersoll & Rooney PC

(57) ABSTRACT

An exemplary mobile apparatus for assessing an operating condition of an asset. The mobile device includes at least one sensor device for acquiring data related to one or more operational or environmental characteristics of an asset during operation. The mobile device further includes a processing device encoded with a neural network architecture having one or more models trained to identify one or more operating conditions of one or more assets according to asset type. The processing device can determine an operating condition of the asset by extracting features from the acquired data and comparing attributes of the extracted features to attributes of at least one known operating condition determined through training of the models. The mobile device can also include an output interface to output a result of the determination performed by the processing device, which can include communicating the result to a remote device.

20 Claims, 4 Drawing Sheets

(51) Int. Cl.
| | |
|---|---|
| *G06F 18/213* | (2023.01) |
| *G06F 18/214* | (2023.01) |
| *G06N 3/04* | (2023.01) |
| *G06Q 10/0631* | (2023.01) |
| *G06Q 10/20* | (2023.01) |
| *G06V 10/764* | (2022.01) |
| *G06V 10/77* | (2022.01) |
| *G06V 10/774* | (2022.01) |
| *G06V 10/776* | (2022.01) |
| *G06V 10/82* | (2022.01) |

(52) U.S. Cl.
CPC ............ *G06F 18/214* (2023.01); *G06N 3/04* (2013.01); *G06N 3/08* (2013.01); *G06Q 10/20* (2013.01); *G06V 10/764* (2022.01); *G06V 10/7715* (2022.01); *G06V 10/774* (2022.01); *G06V 10/776* (2022.01); *G06V 10/82* (2022.01)

(56) References Cited

U.S. PATENT DOCUMENTS

| | | | |
|---|---|---|---|
| 10,981,541 B2 | 4/2021 | Golduber | |
| 11,380,192 B2 | 7/2022 | Kanehara et al. | |
| 11,897,068 B2 | 2/2024 | Morita et al. | |
| 2014/0074345 A1* | 3/2014 | Gabay | G07C 5/008 701/33.9 |
| 2018/0154867 A1 | 6/2018 | Golduber | |
| 2018/0261237 A1 | 9/2018 | Moore et al. | |
| 2019/0197886 A1 | 6/2019 | Kanehara et al. | |
| 2019/0241155 A1 | 8/2019 | Golduber | |
| 2020/0061768 A1 | 2/2020 | Morita et al. | |

FOREIGN PATENT DOCUMENTS

| | | |
|---|---|---|
| JP | 2018097494 A | 6/2018 |
| JP | 2018524749 A | 8/2018 |
| JP | 2018152662 A | 9/2018 |
| JP | 2019117446 A | 7/2019 |
| JP | 2019139734 A | 8/2019 |
| WO | 2015073687 A1 | 5/2015 |

OTHER PUBLICATIONS

Written Opinion (PCT/ISA/237) issued on Dec. 15, 2020, by the US Patent Office as the International Searching Authority for International Application No. PCT/US20/52232.

The extended European Search Report issued on Sep. 18, 2023, by the European Patent Office in corresponding European Application No. 20869614.6. (9 pages).

Office Action (Notice of Reasons for Refusal) issued on Sep. 30, 2024, by the Japanese Patent Office in corresponding Japanese Patent Application No. 2022-518842, and an English Translation of the Office Action. (10 pages).

* cited by examiner

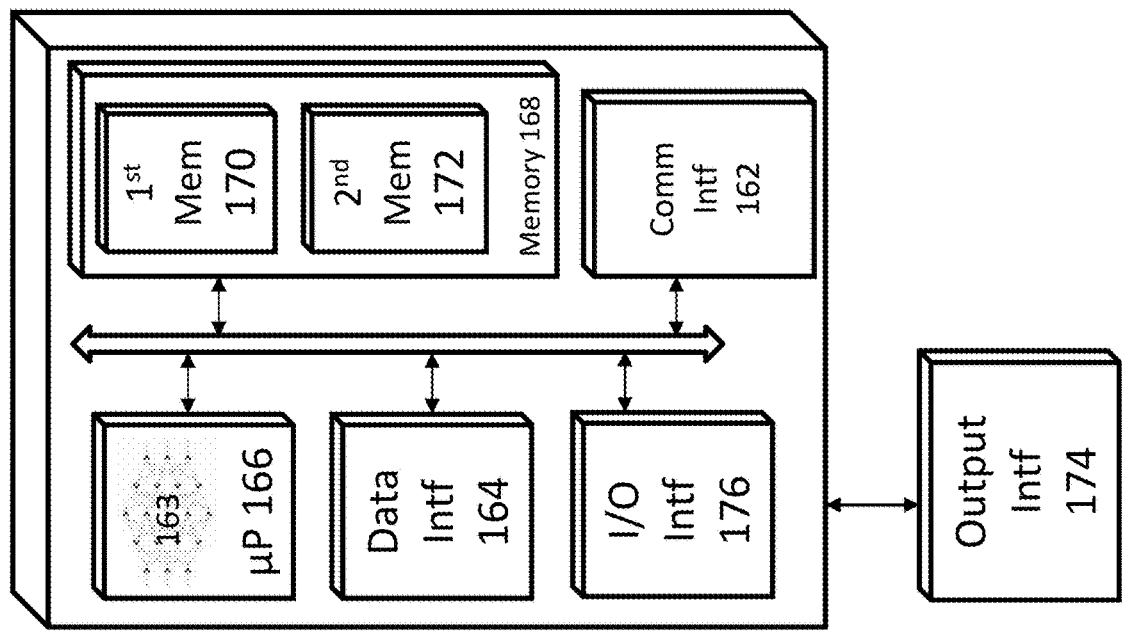
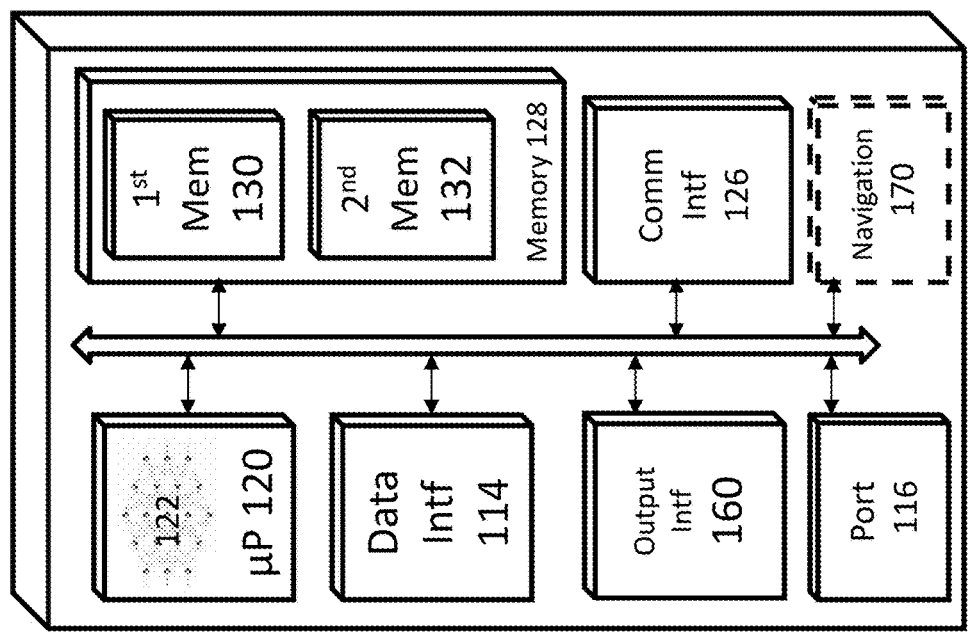
Fig. 2

SYSTEM AND METHOD FOR ASSESSING AN OPERATING CONDITION OF AN ASSET

FIELD

The present disclosure relates to determining an operating condition of an asset using a plurality of sensor data.

BACKGROUND

Inspection and diagnosis of the health and status of assets (such as mechanical systems, structures, structural components, humans, and other objects, or the operating or environmental conditions of the assets) require a significant amount of time, cost, and expertise, and failure to properly monitor the assets can result in degradation, inefficiency, downtime, or even catastrophic failure, as applicable, of the asset. These effort-intensive activities and the harm caused by failure to perform these activities in a comprehensive manner, or at all, can, for example, strain the resources of organizations that maintain large numbers of mechanical systems and have a sizeable amount of infrastructure. As a result, necessary inspections and diagnoses may not be sustained consistently, and ailing systems are not identified before failure. Equipment and infrastructure failures result in substantial unnecessary cost or failure to accomplish organization goals, as well as possible injury and death. This invention reduces the time, effort, and expertise required to perform asset (such as mechanical system and infrastructure machine health) assessment and reporting, allowing organizations to perform more comprehensive asset health assessments, reducing the likelihood of asset failure.

Sensor technologies have been used to monitor equipment for many years. In existing implementations, the sensors are generally fixed/stationary sensors that are physically set to detect change or an out of specification condition for a specific asset. To add sensors to multiple assets requires replication of the fixed sensor arrays and specific tuning for each individual asset or component of the asset. This approach is complex, takes up space, and is often cost prohibitive.

SUMMARY

An exemplary mobile apparatus for assessing an operating condition of an asset is disclosed, the device comprising: at least one sensor device for acquiring data related to an operating characteristic of the asset or an operating environment of the asset during operation; a processing device encoded with a neural network architecture having one or more models trained to identify one or more operating conditions of the asset by processing the acquired data according to sensor type, the processing device being configured to determine an operating condition of the subject asset by extracting features from the acquired data and comparing attributes of the extracted features to attributes of at least one known operating condition determined through training of the one or more models; and an output interface configured to output a result of the determination performed by the processing device, which can include communicating the result to an external computing device.

An exemplary method for assessing an operating condition of an asset is disclosed, the method comprising: acquiring, via one or more sensors of a mobile device, data related to at least one of an operational characteristic or an environmental characteristic of an asset during operation; extracting, via a processing device encoded with a neural network architecture having one or more trained models, each model having one or more layers trained to recognize at least one condition and function of one or more assets, one or more features from the acquired data based on sensor type and none or more of sensor locations, one or more operational conditions of the one or more sensors, and an operational or environmental condition with a potential adverse effect on one or more assets, one or more features from the acquired data based on sensor type; comparing, via the processing device, attributes of the extracted features to attributes of at least one operating condition known through training of the one or more trained models; determining, via the processing device, an operating condition of the asset based on a result of the at least one comparison; and outputting, via an output interface, a result of the determination, which can include communicating the result to an external computing device.

An exemplary computing device for assessing an operating condition of an asset is disclosed, the computing device comprising: a communication interface configured to receive sensor data associated with one or more assets from at least one remote sensor device over a network, the sensor data associated with a plurality of sensor types; and a processing device encoded with a neural network architecture including one or more models, the processing device configured to train the one or more models based on the sensor data to identify at least one normal operating condition and at least one fault condition of the one or more assets according to asset type based on sensor data.

An exemplary method for assessing an operating condition of asset is disclosed, the method comprising: receiving, in a communications interface, asset data from one or more mobile devices, the asset data including at least sensor data associated with at least one sensor type and one asset type and metadata associated with a respective mobile device of the one or more mobile devices; parsing, in one or more data interfaces, the sensor data based on a respective sensor type; processing, in a processing device encoded with a neural network architecture having one or more models, the parsed data to determine an operating condition of the one more assets and train the models to identify at least one normal operating condition and one or more fault conditions of the one or more assets according to the corresponding asset types, sensor data, associated sensor types, and the metadata.

DESCRIPTION OF THE DRAWINGS

Exemplary embodiments are best understood from the following detailed description when read in conjunction with the accompanying drawings. Included in the drawings are the following figures:

FIG. 2 illustrates a mobile device and processing server in accordance with an exemplary embodiment of the present disclosure.

Further areas of applicability of the present disclosure will become apparent from the detailed description provided herein. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to systems and methods for analyzing the condition of an asset. Of particular utility are exemplary embodiments that enable use in remote or limited bandwidth environments. These embodiments of the method involve acquiring sensor data, such as audio, imagery, and motion data, from an edge device and processing the data through machine learning models running on the device if no or limited bandwidth is available in the operating environment to assess the health of an associated asset. If adequate bandwidth is available, then the processing could be done in a cloud or distant location. The results of the processing are shown to users to build diagnostic reports or feed other data systems and applications (e.g., augmented reality). The system can automatically link conditions identified to maintenance manuals and identify parts needed to repair the asset. Specifically, an application of this invention can pertain to the use of such models to identify potential or actual maintenance issues in mechanical systems (e.g., military systems, cars, fixed or mobile machinery) and infrastructure (e.g., structural components, power transmission lines, gas pipelines, bridges), as well as to report the results of the model inference.

Figure 1:
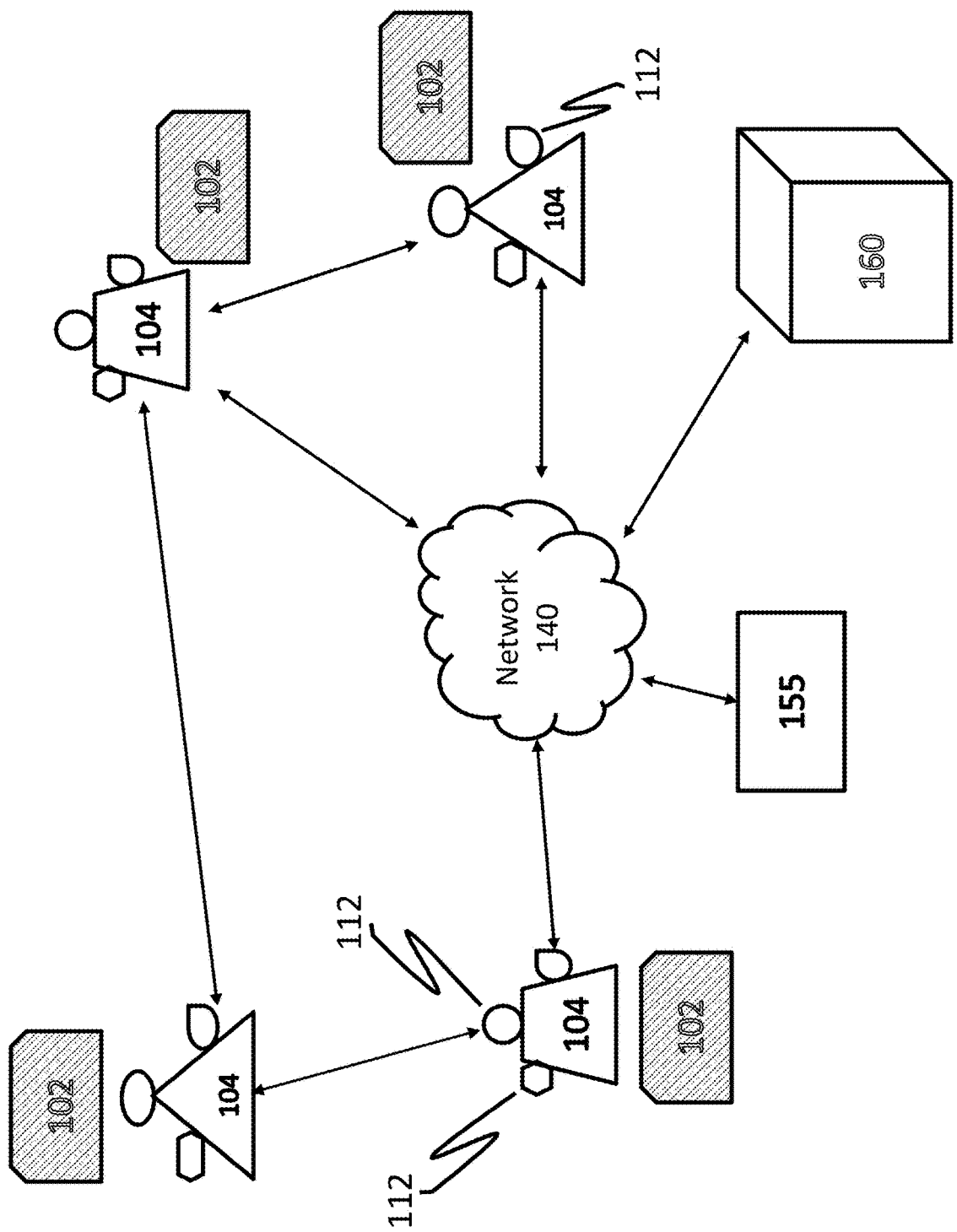
FIG. 1 illustrates a system structure in accordance with an exemplary embodiment of the present disclosure.

FIG. 1 illustrates a system structure in accordance with an exemplary embodiment of the present disclosure.

As shown in FIG. 1, the system 100 includes a mobile device 110 for assessing an operating condition of an asset 120. The mobile device 110 can include a plurality of sensor devices 112 for acquiring data related to one or more operational characteristics of an asset 120 (or its associated external or internal environmental characteristics, such as wind conditions, approaching ocean wave patterns, surrounding and approaching barometric pressure readings, air density, pH or speed of fluid flow around the asset, depth of an asset in fluid, cloud cover, rain, weight of objects interacting with the asset, environmental temperatures, humidity, other objects within a radius of the asset, external sound or noise, asset temperature, etc., that may affect operational characteristics of the asset) during operation. The operation of the asset 102 can include various operating modes in which the asset is stationary or in motion. The asset can include a machine such as a personal or industrial vehicle for travel in air, land, or water, electromechanical engines of all types, robotic machines, electromechanical valves, mechanical instruments, printing devices, or any other object or device having a mechanized movement, a drive, and/or operating cycle. The mobile device 110 can be any portable device designed to move either manually or autonomously between two locations and having a structural capacity to support the plurality of sensor devices 112. For example, according to exemplary embodiments of the present disclosure, the mobile device 110 can be implemented in the form of a smartphone, an aerial or land-based vehicle, a hand-held or hand-carried electronic device or tool, or any other suitable electronic device that can be attached, affixed to, or carried by a person or moving object as desired.

The plurality of sensors 112 can include any combination of an image sensor, an acoustic sensor, a motion sensor, a thermal sensor, a gas sensor, a moisture/humidity sensor, an airflow sensor, a radiation sensor of any type, carbon monoxide sensor, carbon dioxide sensor, air flow sensor, distance measurement sensor, pressure sensor, or any other suitable sensing device for detecting a physical or operational property of an asset 102 or the asset's operating environment. According to another exemplary embodiment the sensor devices can be configured to detect physiological properties of a human or animal. For example, the sensor can include a heartbeat sensor, a pulse oxygen sensor, a blood pressure sensor, or any other suitable sensor, or measurement of health characteristics such as images of the body, including, for example, x-ray, CT, and MRI scans, sonograms, EKG, ECG, pictures of a patient's body, etc., or various series of the foregoing over time, used by medical professionals for determining the health of a patient. The sensor devices 112 can be integrated into or affixed to a housing 116 of the mobile device 110. According to another exemplary embodiment, the sensor devices 112 can include a port 118 for connecting to an external sensor device 112 via a direct wire or wireless connection or adaptor.

The mobile device 110 can include one or more data interfaces 114 configured to convert the acquired sensor data into a specified format according to sensor type. The data interfaces can include a combination of hardware and software. For example, according to an exemplary embodiment, the sensor devices 112 can be configured as an image sensor that detects electromagnetic radiation including visible or infrared light, radio frequencies, microwaves, or other relevant signal emissions by the asset 102 as desired. The image sensor can be configured to generate video or still images from the detected electromagnetic radiation. The sensor devices 112 can also be configured as an acoustic sensor detecting sound or audio recordings, and a motion sensor, such as gyroscope, speed sensor, or accelerometer, for detecting vibrational, acceleration, speed, or overall movement data. The one or more data interfaces 114 are configured to process the sensor data by converting the data to a specific format required for analysis. For example, the conversion process can be specific to the type of sensor data and sensor type and include operations such as image whitening, audio signal isolation, sample rate normalization, or any other suitable operation or process for normalizing a specific signal as desired. According to exemplary embodiments of the present disclosure, the conversion process performed by the one or more data interfaces 114 can be used to generate abstract (e.g., theoretically or mathematically derived) representations of the sensor data. For example, the acoustic and vibrational data can be processed in a spectrogram conversion prior to further analysis.

According to an exemplary embodiment, the sensor devices 112 can also be configured to obtain data pertaining to the environment surrounding the subject asset 102. For example, the sensor devices can be configured to obtain weather information, dew point, humidity, air temperature, wind speed, wind direction, composition of air, or any other suitable environmental conditions as desired.

As shown in in FIG. 1, the mobile device can include a processing device 120 enclosed within the housing 116. The processing device 120 can be encoded with a neural network architecture 122 having one or more models trained to identify one or more operating conditions of a plurality of assets 102 according to asset type. The processing device 120 can be configured to determine an operating condition of the subject asset 102 by extracting features from the converted data and comparing attributes of the extracted features to attributes of a known operating condition determined through training of the one or more models. For example, the processing device can apply a weighted kernel (e.g., matrix) to the extracted features according to sensor type and determine, based on a comparison of the kernel to every element of the one or more of the extracted features, whether the operating condition includes one or more of a normal condition, mechanical fault, a structural fault, an electrical fault, or a potential adverse operating environment. The one or more models of the neural network architecture 122 can be trained using data that is selected for tuning each model to be sensitive to a broad range of problems with mechanical systems and infrastructures as well as be able to recognize varying states of operation of those mechanical systems (such as high and low efficiency operation). Based on the determined operating condition, the neural network architecture 122 can identify one or more parts associated with a repair of one or more of the mechanical fault, the structural fault, and the electrical fault.

The neural network architecture 122 receives sensor data from the one or more data interfaces 114 that has been converted into condensed representations. The conversion process and methodology has bearing on the model performance. According to an exemplary embodiment of the present disclosure, the audio and vibrational feature conversion in particular involves a spectrogram conversion for input into one of the plurality of models of the neural network architecture 122, such as a convolutional model. The spectrogram conversion involves the audio and vibrational data being converted to have characteristics of image data. For example, the audio or vibrational data can be parsed into smaller overlapping segments and converted from the time domain to the frequency domain. The frequency domain values are converted to polar coordinates, which results in magnitudes and phases of different frequencies. The frequency domain data is sampled using a Fast Fourier Transform to convert the polar coordinate data back into the time domain. The resulting time domain data can be used to show the change in different frequencies over time.

The mobile device 110 includes an output interface 124 configured to output a result of the determination performed by the processing device. The output interface 124 can be integrated into the housing 116 and include any suitable display or output device that allows a user or operator to receive and, if applicable, input information. The output interface 124 can include one or more of a graphical display device, printer, audio output device, one or more light emitting diodes (LEDs), external storage device, external computing device, or other suitable electronic device or output type as desired. For example, according to an exemplary embodiment the output interface 124 can be configured to display images and text and allow commands or information to be input to the mobile device 110 by manipulating graphical icons, graphical objects, virtual keys, or any other suitable manner of providing interactive controls or commands as desired.

As shown in FIG. 1, the mobile device 110 can include a communication interface 126 that is integrated into and/or enclosed by the housing 116. The communication interface 126 is configured to communicate with a remote device over a communication or data network 140. According to an exemplary embodiment of the present disclosure, the communication interface 126 can be configured to transmit the converted data over a network 140 to a remote computing device, which can include one or more other mobile devices 150 and a processing (e.g., central) server 160. According to another exemplary embodiment, the communication interface 126 can be configured to receive updated models of the neural network architecture 122 from the processing server 160 and raw sensor data, converted sensor data, or operating condition determinations from other mobile devices 150 over the network 140. The communication interface 126 can include a hardware component such as an antenna, a network interface (e.g., an Ethernet card), a communications port, a PCMCIA slot and card, or any other suitable component or device as desired. The hardware and software components of the communication interface 126 can be configured to receive data, e.g., images, according to one or more communication protocols and data formats. For example, the communication interface 126 can be configured to communicate over a network 140, which may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. During a receive operation, the communication interface 126 can be configured to identify parts of the received data via a header and parse the data signal and/or data packets into small frames (e.g., bytes, words) or segments for further processing at the processing device 120.

The mobile device 110 can also include a memory device 128 including a first memory structure 130 and a second memory structure 132. The memory device 128 can be enclosed in the housing 116 or be configured to have any of the first or second memory structures 130, 132 external to the housing 116. The first memory structure 130 is configured to store raw sensor data and/or the converted data of the plurality of sensors 112 integrated or attached to the mobile device 110. The first memory structure 130 is also configured to store raw sensor data and/or converted data received by the communication interface 126 from another mobile device 150 over the network 140. The second memory structure 132 can be configured to store the models of the neural network architecture 122, which can include updated models of the neural network architecture 122 received by the communication interface 126 from the processing server 160 over the network 140. The updated models can include changes based on the raw or converted data, as applicable, transmitted by the mobile device 110 to the processing server 160 over the network.

According to an exemplary embodiment of the present disclosure, the mobile device 110 can include a navigation system 170. The navigation system 170 can include a combination of hardware and software components which can provide automatic or manual navigation or positioning of the mobile device 110 relative to specified coordinates and relative to the asset 102. According to an exemplary embodiment, the mobile device 110 configured with the navigation system 170 can include a propulsion system for moving the mobile device 110 over land, air, or water. For example, the navigation system 170 can include program code or software stored in the second memory structure 132 of the memory device 128 and executed by the processing device 120. According to an exemplary embodiment, the mobile device 110 can include at least one other processing device 180 for executing the program code or software stored in the second memory structure 132 for command and control of the navigation system 170. For manual navigation, the mobile device 110 can be configured to receive command and/or control signals from a remote-control device 155 via the communication interface 126 over the network. 140. According to an exemplary embodiment, the communication interface 126 can also be configured to send data of one or more of the sensors 112 to a remote control device 155 and receive commands for positioning the mobile device 110 relative to the asset 102 and/or receive one or more sensor commands from the remote control device 155 to orientate one or more of the sensors 112 for acquiring data relevant to the operating condition of the asset 102. The processing device 120 can communicate sensor data such as image data to the remote-control device 155 to provide a visual orientation and position of the mobile device 110 to an operator. The navigation system 170 can also be configured for autonomous positioning of the mobile device 110 relative to the asset 102. The navigation system 170 can receive data acquired by one or more of the sensors 112 and control a motive system of the mobile device 110 into a position for acquiring data from the asset 102 via the plurality of sensors 112. Based on the acquired data from one or more of the sensors 112, the navigation system 170 can also be configured to autonomously orient one or more of the sensors 112 for acquiring data relevant to the operating condition of the asset 102.

The mobile device 110 can include a communications infrastructure 125 including a bus, message queue, network, multi-core message-passing scheme, etc., for connecting the communication interface 126, the data interfaces 114, the processing device 120, the memory device 128, and the output interface 124 for communication of data and control signals.

As shown in FIG. 1, the processing server 160 can include a communication interface 162 configured to communicate with a plurality of mobile devices 104 over the network 140. According to an exemplary embodiment, the processing server 160 can be configured to receive asset data associated with one or more assets 102 from at least one of the plurality of mobile devices 104 over the network 140. The asset data can include raw sensor data generated by the plurality of sensors (or converted sensor data, as applicable) of the respective mobile device 104. For example, the converted sensor data can include sensor data that has been converted into a specified format by the respective mobile device 104 according to sensor type. The asset data can also include an operating condition determination of the one or more assets 102 and metadata associated with a mobile device 110. The metadata of the mobile device 110 can include a location (e.g., geospatial coordinates) of the mobile device 110, an operating system executed by the mobile device 110, a hardware configuration of the mobile device 110, application software executable by the mobile device 110, signal strength of the network 140 at the time the asset data was communicated, a battery level of the mobile communication device 110, a time at which the asset data (e.g., sensor data) was obtained, weather (e.g., temperature, humidity, barometric pressure, dew point, etc.), information regarding a registered user or owner of the mobile device 110, or any other suitable data or information as desired. It should be understood that portions of the metadata could be obtained through any number of separate applications or program code stored on and/or executed by the processing device 120 or stored in the second memory structure 132 and/or volatile or non-volatile portion of the memory device 128.

The communication interface 162 can be configured with the same hardware and software components as discussed above regarding the communication interface 126 of the mobile device 110 and be configured for connection to any of the same networks or communication links discussed with respect to the communication interface 126.

The processing server 160 can include one or more data interfaces 164 for converting the raw sensor data received by the communication interface 162. The data interfaces 164 can include a combination of hardware and software and be configured to perform processes and/or operations on the raw sensor data or converted sensor data, as applicable, with respect to the data interfaces 114 of the mobile device 110.

The processing server 160 can include a processing device 166 encoded with a neural network architecture 163 including one or more models, the processing device 166 configured to train the one or more models based on the asset data to identify one or more normal operating conditions and one or more fault conditions of the one or more assets according to asset type. According to another exemplary embodiment, if the asset data includes raw sensor data, the processing device 164 is configured to determine an operating condition of the one or more assets 102 based on the converted data generated by the one or more data interfaces 164. According to yet another exemplary embodiment, if the asset data includes converted sensor data and an operating condition determination of the one or more assets 102, the processing device 166 is configured to train the one or more models of the neural network architecture 163 based on the determined condition to generate updated models. The processing device 164 sends the updated models to the mobile device 110 over the network 140.

The processing server 160 can include a memory device 168 having a first memory structure 170 configured to store the raw or converted sensor data, the operating condition determination, and the metadata received from a plurality of mobile devices 104. The memory device 168 also includes a second memory structure 172 configured to store the one or more models associated with the neural network architecture 163. The first memory structure 170 can also be configured to store any additional information associated with the plurality of assets 102. The additional information can be requested and/or accessed over the network 140 from manufacturer, industry, public, or government databases via the communication interface 162 of the processing device 166.

The processing device 166 can be configured to generate a report, in association with a specified type or identified asset, one or more of an operating condition trend analysis, a maintenance scheduling recommendation and plan, an order for parts and inventory, a remediation plan, an inventory status report, or any other suitable report as desired based on information stored in the first memory structure 170 of the memory device 168. The report can be generated automatically based on a specified schedule or be generated in response to a request from at least one of the plurality of mobile devices 104. The report can be communicated to the requesting mobile device 110 or broadcast according to a desired schedule to the plurality of mobile devices 104 via the communication interface 126.

The processing server 160 can include an output interface 174 which can be connected to receive data from the processing device 166 via an input/output (I/O) interface 176. The I/O interface 176 can be configured to receive the signal from the processing device 166 and generate a data signal suitable for output by the output interface 174. The I/O interface 176 can include a combination of hardware and software for example, a processor, circuit card, or any other suitable hardware device encoded with program code, software, and/or firmware for communicating via a direct wired or wireless link with the output interface 174. The output interface 174 can include one or more of a graphical display device, printer, audio output device, one or more light emitting diodes (LEDs), an external storage device, an external computing device, or other suitable electronic device or output type as desired.

The processing server 160 can include a communications infrastructure 165 including a bus, message queue, network, multi-core message-passing scheme, for connecting the communication interface 162, the data interfaces 164, the processing device 166, the memory device 168, and the output interface 174 for communication of data and control signals.

The processing server 160 is configured for the evaluation of equipment and infrastructure with the mobile devices 104 and for aggregating the evaluation information and other data from a collection of electronic devices, databases, and mobile devices that are either reporting constantly via a network 140 or that report periodically when the mobile devices 104 achieve a suitable level of data connectivity with the network 140 if the connectivity is unavailable or limited at the time sensor data relevant to the operating condition of the asset is collected. Once the assessments from any number of the plurality of mobile devices 104 are aggregated and stored in the memory device 168 of the processing server 160, the processing server 160 can generate one or more reports which provide a high-level analysis and recommendation based on the aggregated content of the assessments from the mobile devices 104.

Figure 3:
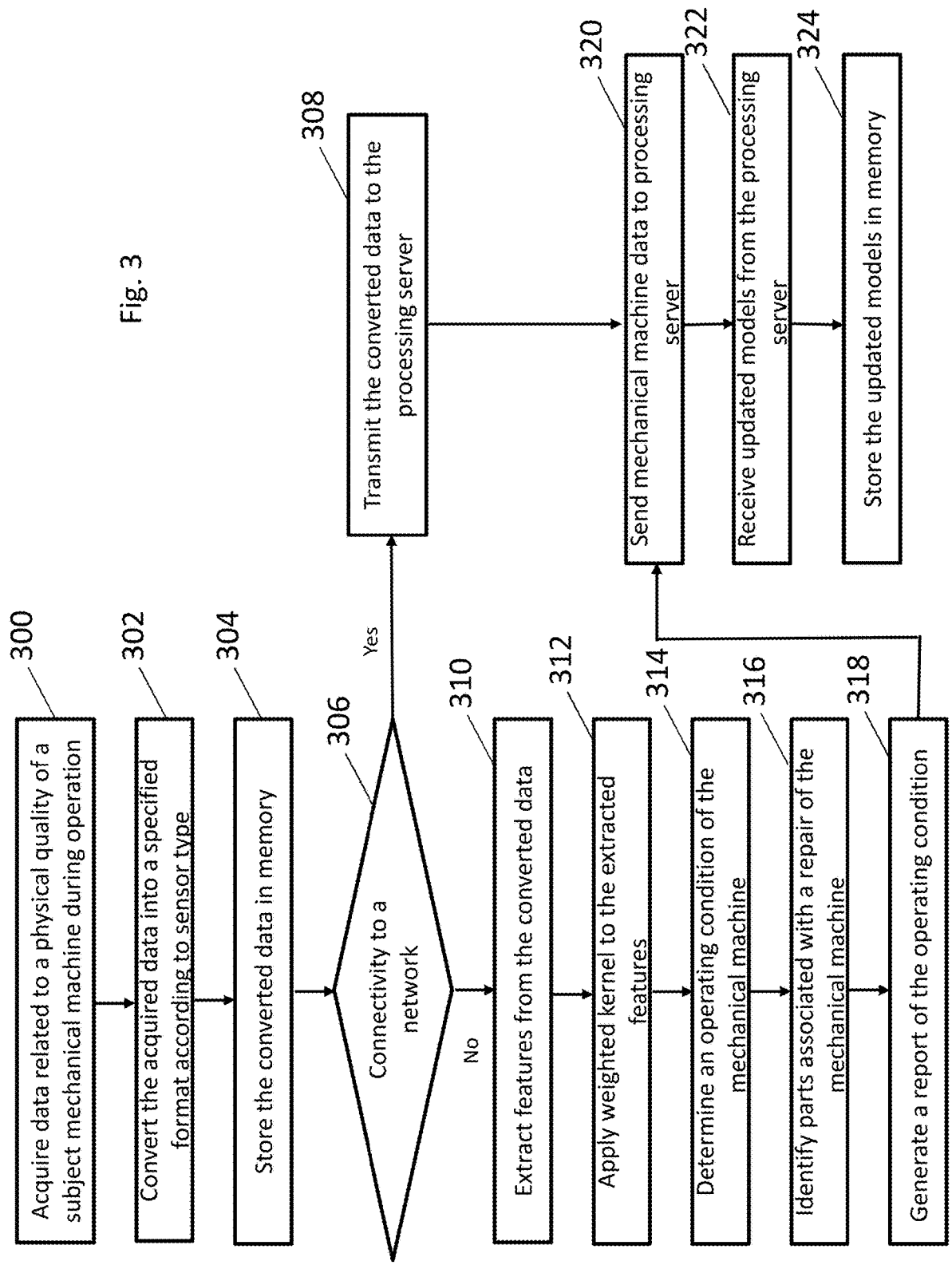
FIG. 3 illustrates a method for assessing an operating condition of an asset by a mobile device in accordance with an exemplary embodiment of the present disclosure.

FIG. 3 illustrates a method for assessing an operating condition of an asset. The method of FIG. 3 can be executed by each of the plurality of mobile devices 104. In step 300, the mobile device 110, activates one or more of the plurality of sensors 112 to acquire data related to a physical quality of an asset 102 during operation. According to exemplary embodiments of the present disclosure, acquiring the sensor data can include one or more of the plurality of sensor devices 112 generating video images or still images of an asset 102 or detecting an emitted sound, a temperature, an emitted gas, and moisture relative to the asset 102. The acquired data is converted into a specified format according to sensor type using one or more of the data interfaces 114 (step 302). The converted data is stored in the first memory structure 130 of the memory device 128 (step 304). If the mobile device 110 has suitable connectivity to the network 140 (step 306), the converted data can be transmitted to a remote computing device 104, 160 via the communication interface 126 (step 308). Otherwise, if the network connectivity is limited or unavailable, the processing device 120 extracts one or more features from the converted data based on sensor type (step 310), and compares attributes of the extracted features to attributes of a known operating condition determined through training of the one or more trained models by applying one or more weighted kernels to the extracted features (step 312). The weighted kernels include attributes of the known operating condition. The processing device 120 determines an operating condition of the asset 102, which includes identifying one or more of a mechanical fault, a structural fault, and an electrical fault based on the comparison result (step 314). Once the operating condition is determined, the processing device 120 can identify one or more parts associated with a repair of one or more of the mechanical fault, the structural fault, and the electrical fault (step 316). An output of the determination result is provided to a user via the output interface 124 by compiling the converted data, the operating condition determination, and metadata associated with the mobile device, and generating a report based on compiled data (step 318). When connectivity to the network 140 is suitable or regained, the mobile device 110 can send its metadata, the operation determination, and the converted sensor data to the processing server 140 via the communication interface 126 (step 320) as asset data. In response to this communication, the mobile device 110 receives from the processing server 140 updated models for the neural network architecture 122 via the communication interface 126 (step 322). The updated models are stored in the second memory structure 132 of the memory device 128 (step 324).

Figure 4:
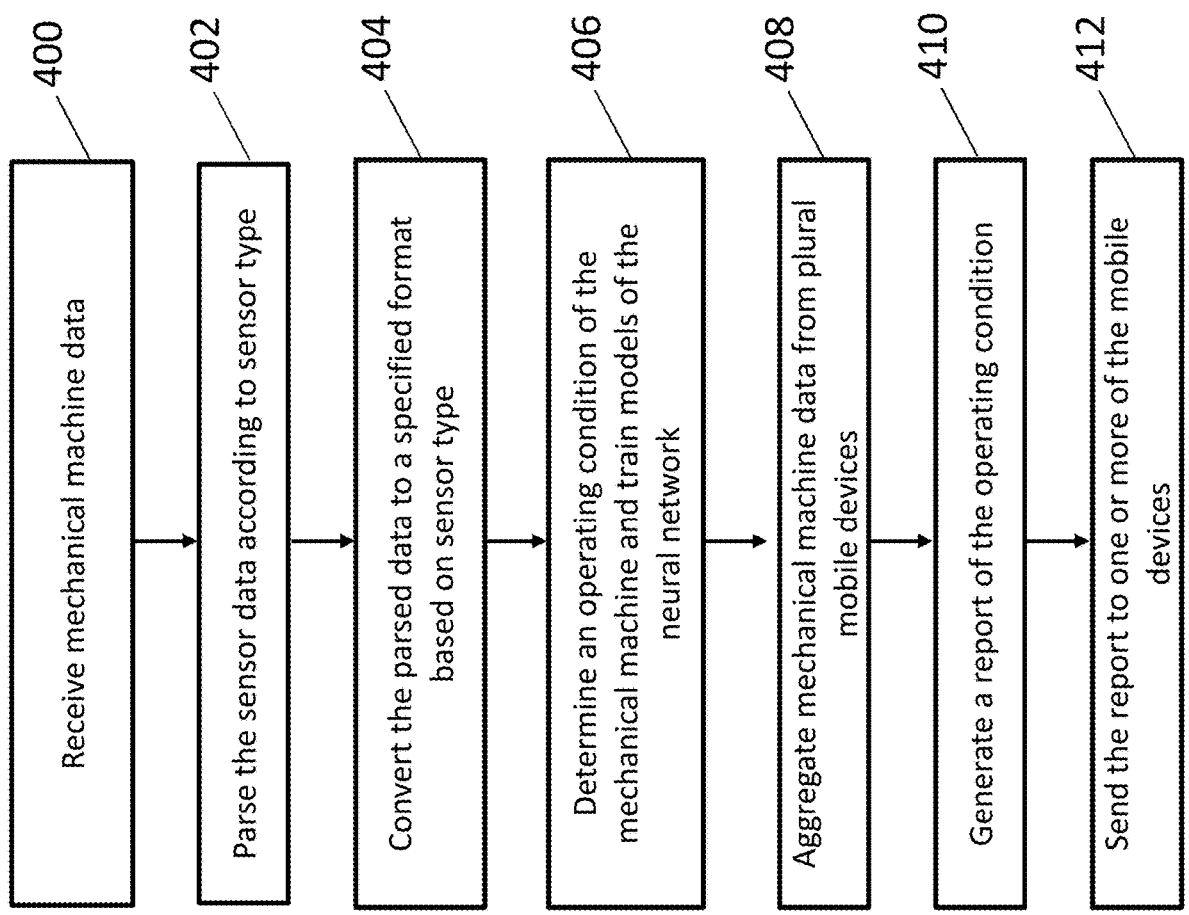
FIG. 4 illustrates a method for assessing an operating condition of an asset by a processing server in accordance with an exemplary embodiment of the present disclosure.

FIG. 4 illustrates a method for assessing an operating condition of an asset in accordance with an exemplary embodiment of the present disclosure. In step 400, the processing server 160 receives asset data from one or more mobile devices 104 over the network 140 via the communication interface 126. The asset data includes sensor data associated with the applicable sensor types and metadata associated with a respective mobile device 110 of the one or more mobile devices 102. The sensor data is parsed in one or more data interfaces 164 based on the respective sensor types of the mobile device 110 which acquired the data (step 402). The one or more data interfaces 164 convert the parsed sensor data into a specified format according to the respective sensor types (step 404). The processing device 166 of the processing server 160, which is encoded with a neural network architecture 163 having one or more models, processes the converted data to determine an operating condition of the one more assets 102 and train the one or more models to identify a normal operating condition and a plurality of fault conditions of the one or more assets according to asset type (step 406). The one or more updated models resulting from the training are transmitted to the mobile device 110 over the network 140 via the communication interface 162. The processing server 160 can receive asset data, which includes an assessment of an operating condition of a respective asset, from one or more other mobile devices 104 via the communication interface 162 over the network 140 and aggregate the asset data by storing it in the first memory structure 170 of the memory device 168 (step 408). The processing device 166 can generate, in association with a specified type or identified asset, one or more of an operating condition trend analysis, a maintenance scheduling recommendation and plan, an order for parts and inventory, a remediation plan, and an inventory status report based on information stored in the first memory structure of the memory device (step 410). The processing device 166 can send one or more of the generated reports to one or more of the mobile devices 104 over the network 140 via the communication interface 162 (step 412).

The computer program code for performing the specialized functions described herein can be stored on computer usable medium, which may refer to memories, such as the memory devices for the mobile devices 104 and processing server 160, which may be memory semiconductors (e.g., DRAMs, etc.). These computer program products may be a tangible non-transitory means for providing software to the mobile devices 104 and processing server 160. The computer programs (e.g., computer control logic) or software may be stored in a memory device 155 resident on or in the mobile devices 104 or processing server 160. The computer programs may also be received via the respective communication interfaces 126, 162. Such computer programs, when executed, may enable the mobile devices 104 and processing server 160 to implement the present methods and exemplary embodiments discussed herein. Accordingly, such computer programs may represent controllers of the mobile devices 104 and processing server 160. Where the present disclosure is implemented using software, the software may be stored in a computer program product or non-transitory computer readable medium and loaded into the mobile devices 104 and processing server 160 using a removable storage drive, an interface, a hard disk drive, or communications interface, where applicable.

The processing devices 120, 166 of the mobile devices 104 and processing server 160, respectively, can include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be compiled by the respective processors (e.g., by a compiling module or engine) prior to execution. For example, the program code may be source code written in a programming language that is translated into a lower-level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the mobile devices 104 and processing server 160 to perform the functions disclosed herein. It will be apparent to persons having skill in the relevant art that such processes result in the mobile devices 104 and processing server 160 being specially configured computing devices uniquely programmed to perform the functions discussed above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein.

What is claimed is:

1. A mobile apparatus for assessing an operating condition of an asset, the apparatus comprising:
   at least one sensor device for acquiring data related to an operating characteristic of the asset and attributes of an operating environment associated with the asset during operation;
   a processing device including a neural network architecture having one or more models trained to identify one or more operating conditions of the asset by processing the acquired data according to sensor type, the processing device being configured to determine an operating condition of the asset by extracting features from the acquired data and comparing attributes of the extracted features to attributes of at least one known operating condition and attributes of the operating environment associated with the asset during operation determined through training of the one or more models; and
   an output interface configured to output a result of the determination performed by the processing device, which can include communicating the result to an external device,
   wherein the processor is configured to assign weights to the extracted features of each sensor based on sensor type, sensor location, and associated operational and environmental conditions of the sensor and the asset, and determine, based on one or more of the extracted features, whether the operating condition includes one or more of a normal condition, a mechanical fault, a structural fault, an electrical fault, and an adverse operating environment.

2. The mobile apparatus of claim 1, comprising:
   one or more data interfaces configured to convert the acquired data into one or more specified data formats according to sensor type and the neural network architecture for analysis by the processing device according to sensor type.

3. The mobile apparatus of claim 2, comprising:
   a memory device including a memory structure configured to store the acquired or converted data of the at least one sensor; and
   a communication interface configured to transmit the acquired or converted data to a remote computing device over a network.

4. The mobile apparatus of claim 3, wherein:
   the at least one sensor includes one or more of an image sensor, an acoustic sensor, a motion sensor, a thermal sensor, a gas sensor, a moisture sensor, a radio frequency sensor, and a fluid flow sensor:
   the communication interface is configured to receive updated models for the neural network architecture from the remote computing device; and
   the memory device is configured to store the models of the neural network architecture including the received updated models in the memory structure,
   the updated models include changes based on at least the acquired or converted data transmitted to the remote computing device over the network,
   the image sensor is configured to generate one or more of video images and still images, and
   the image sensor is configured to detect infrared, non-visible, or visible light.

5. The mobile apparatus of claim 1, comprising:
   a housing for enclosing one or more of the at least the one or more sensor interfaces, the processing device, and the graphical interface,
   wherein the at least one sensor is integrated into the housing or connected to the housing via an associated sensor interface of the one or more sensor interfaces.

6. The mobile apparatus of claim 3, wherein the mobile apparatus is a vehicle comprising:
   a navigation system configured to autonomously position the vehicle relative to the asset based on the acquired data from the at least one sensor.

7. The mobile apparatus of claim 3, wherein the mobile apparatus is a vehicle comprising:
   a navigation system configured to position the vehicle relative to the asset,
   wherein the communication interface is configured to send, over a network, the acquired data from one or more of the at least one sensor for determining location and position of the vehicle, and receive navigation commands from a remote-control device to position the vehicle relative to the asset and/or orient one or more of the at least one sensor.

8. The mobile apparatus of claim 1,
   wherein the processing device is configured to identify one or more parts associated with a repair of one or more of the mechanical fault, the structural fault, and the electrical fault, or identify an action to address the adverse operating environment.

9. A method for assessing an operating condition of an asset, the method comprising:
   acquiring, via one or more sensors of a mobile device, data related to at least one of an operational characteristic or an environmental characteristic of an asset during operation;
   extracting, via a processing device encoded with a neural network architecture having one or more trained models, each model having a one or more layers trained to recognize at least one condition and function of one or more assets, one or more features from the acquired data based on sensor type and none or more of sensor location, one or more operational conditions of the one or more sensors, and an operational or environmental condition with a potential adverse effect on one or more assets, or one or more features from the acquired data based on sensor type;

assigning, via the processing device, weights to the extracted features of each sensor based on sensor type, sensor location, and associated operational and environmental conditions of the sensor and the asset;

determining, via the processing device, based on one or more of the extracted features, whether the operating condition includes one or more of a normal condition, a mechanical fault, a structural fault, an electrical fault, and an adverse operating environment, by comparing attributes of the extracted features to attributes of at least one operating condition known through training of the one or more trained models;

determining, via the processing device, an operating condition of the asset based on a result of the at least one comparison; and outputting, via an output interface, a result of the determination, which includes communicating the result to an external computing device.

10. The method of claim 9, comprising:
converting, via one or more sensor interfaces, the acquired data into a specified data format for analysis by the processing device according to sensor type and neural network architecture;
storing, in a memory structure of the memory device, the acquired or converted data of the one or more sensors; and
transmitting, via a communication interface, the acquired or converted data to a remote computing device over a network.

11. The method of claim 9, comprising:
receiving, via the communication interface, updated models for the neural network architecture from the remote computing device; and
storing, in the memory structure of the memory device, the models of the neural network architecture including the received updated models.

12. The method of claim 9, wherein acquiring the data comprises:
generating, via the one or more of the sensors, video images or still images; or
detecting, via the one or more sensors, an emitted sound, a temperature, an emitted gas, moisture, motion, speed, acceleration, reflected light, heat generation, and fluid flow in relation to the asset.

13. The method of claim 10, wherein extracting one or more features comprises:
applying one or more weighted kernels to the acquired or converted data, the weighted kernels including attributes of a corresponding known operating condition.

14. The method of claim 9, wherein determining the operating condition comprises:
identifying, via the processing device, one or more parts associated with a repair of one or more of the mechanical fault, the structural fault, and the electrical fault, or action to address the potentially adverse environmental or operating condition.

15. The method of claim 10, wherein outputting a result of the determination comprises:
compiling, via the processing device, the acquired or converted data, the operating condition determination, and metadata associated with the mobile device; and
generating, via the processing device, a report based on the compiled data.

16. A computing device for assessing an operating condition of an asset, the computing device comprising:
a communication interface configured to receive sensor data associated with one or more assets from at least one remote sensor device over a network, the sensor data associated with a plurality of sensor types; and
a processing device encoded with a neural network architecture including one or more models, the processing device configured to train the one or more models based on the sensor data to extract features from asset sensor data of each sensor, assign weights to the extracted features of each sensor based on sensor type, sensor location, and associated operational and environmental conditions of the sensor and the asset, and determine, based on one or more of the extracted features, and identify at least one normal operating condition, a mechanical fault, a structural fault, an electrical fault, and an adverse operating environment of the one or more assets according to asset type based on sensor data.

17. The computing device according to claim 16, wherein the sensor data includes raw sensor data of one or more sensor types, the computing device comprising:
a data interface configured to convert at least a portion of the raw sensor data into one or more specified data formats according to the associated sensor type and neural network architecture for analysis by the processing device,
wherein the processing device is configured to determine an operating condition of the one or more assets based on the converted sensor data.

18. The computing device according to claim 16, wherein training the one or more models generates one or more updated models, and the communication interface is configured to send the one or more updated models to the at least one remote device over the network.

19. The computing device according to claim 16, wherein the received sensor data includes asset data associated with an operating condition determination of the one or more assets and metadata associated with the at least one remote sensor device, the computing device comprising:
a memory device including a first memory structure configured to store the operating condition determination related to a plurality of assets including the one or more assets and the metadata of a plurality of remote devices including the at least one remote sensor device.

20. The computing device according to claim 19, wherein the processor is configured to generate, in association with a specified type of or identified asset, one or more of an operating condition trend analysis, a maintenance scheduling recommendation and plan, an order for parts and inventory, a remediation plan, and an inventory status report based on information stored in the first memory structure of the memory device.

* * * * *